United States Patent
Lin et al.

(10) Patent No.: US 8,410,370 B2
(45) Date of Patent: Apr. 2, 2013

(54) TOUCH PAD

(75) Inventors: Jao-Ching Lin, Taipei (TW); Abel Lin Chu, Taipei (TW); Chung-Yi Shen, Taipei (TW); Chih-Chieh Yu, Taipei (TW)

(73) Assignee: Sentelic Corporation, Neihu Dist., Taipei (TW)

( * ) Notice: Subject to any disclaimer, the term of this patent is extended or adjusted under 35 U.S.C. 154(b) by 358 days.

(21) Appl. No.: 12/787,555

(22) Filed: May 26, 2010

(65) Prior Publication Data
US 2011/0247883 A1 Oct. 13, 2011

(30) Foreign Application Priority Data
Apr. 13, 2010 (TW) ................. 99206623 U (51) Int. Cl.
*G06F 3/041* (2006.01)
(52) U.S. Cl. .......... 174/250; 345/33; 345/173; 345/174; 345/156; 345/157; 178/18.01; 178/18.06
(58) Field of Classification Search .......... 345/173–175, 345/156, 200, 33, 361; 178/18.01–18.09, 178/18.11; 174/250, 254, 258, 259, 260; 361/760, 792, 793, 794, 796
See application file for complete search history.

(56) References Cited

U.S. PATENT DOCUMENTS

| | | | | |
|---|---|---|---|---|
| 4,733,222 | A * | 3/1988 | Evans | 341/33 |
| 6,188,391 | B1 | 2/2001 | Seely et al. | |
| 8,040,321 | B2 * | 10/2011 | Peng et al. | 345/169 |
| 2008/0074398 | A1 * | 3/2008 | Wright | 345/173 |

* cited by examiner

*Primary Examiner* — Timothy J Thompson
*Assistant Examiner* — Pete Lee
(74) *Attorney, Agent, or Firm* — Winston Hsu; Scott Margo (57) ABSTRACT

A touch pad including a printed circuit board, a plurality of column-conductor groups and a plurality of row-column groups. The printed circuit board is formed with an upper surface and a lower surface. The column-conductor groups include a plurality of first column-conductors and a plurality of second column-conductors. The row-conductor groups include a plurality of first row-conductors and a plurality of second row-conductors. The first column-conductors and the first row-conductors are provided on the upper surface. The second column-conductors and the second row-conductors are respectively provided on one and the other of the upper surface and the lower surface, and electrically connected to each other through column-vias and row-vias. Whereby the structure, the existing material and process can be still be used, and the problem of crossed wires can be avoided, also the yield of products can be increased with less waste of materials.

6 Claims, 8 Drawing Sheets

TOUCH PAD

BACKGROUND OF THE INVENTION

1. Field of the Invention

The present invention relates to a touch pad, and in particular to a touch pad having reduced number of circuit boards and cost and having an increased yield of products.

2. Description of Prior Art

Existing touch pads are primarily divided into four categories including resistance-type, capacitance-type, acoustic-type and optical-type based on their principles of sensing signals. The capacitance-type touch pad is dust-proof, fire-resistant and high-definition, so that it is widely used. The capacitance-type touch pad is configured to identify the position of contact based on a change of capacitance. More specifically, the capacitance-type touch pad is configured to identity the coordinates of a contact point based on a change of capacitance between electrodes caused by the approach of an object (such as a finger or other conductor).

Figure 1:
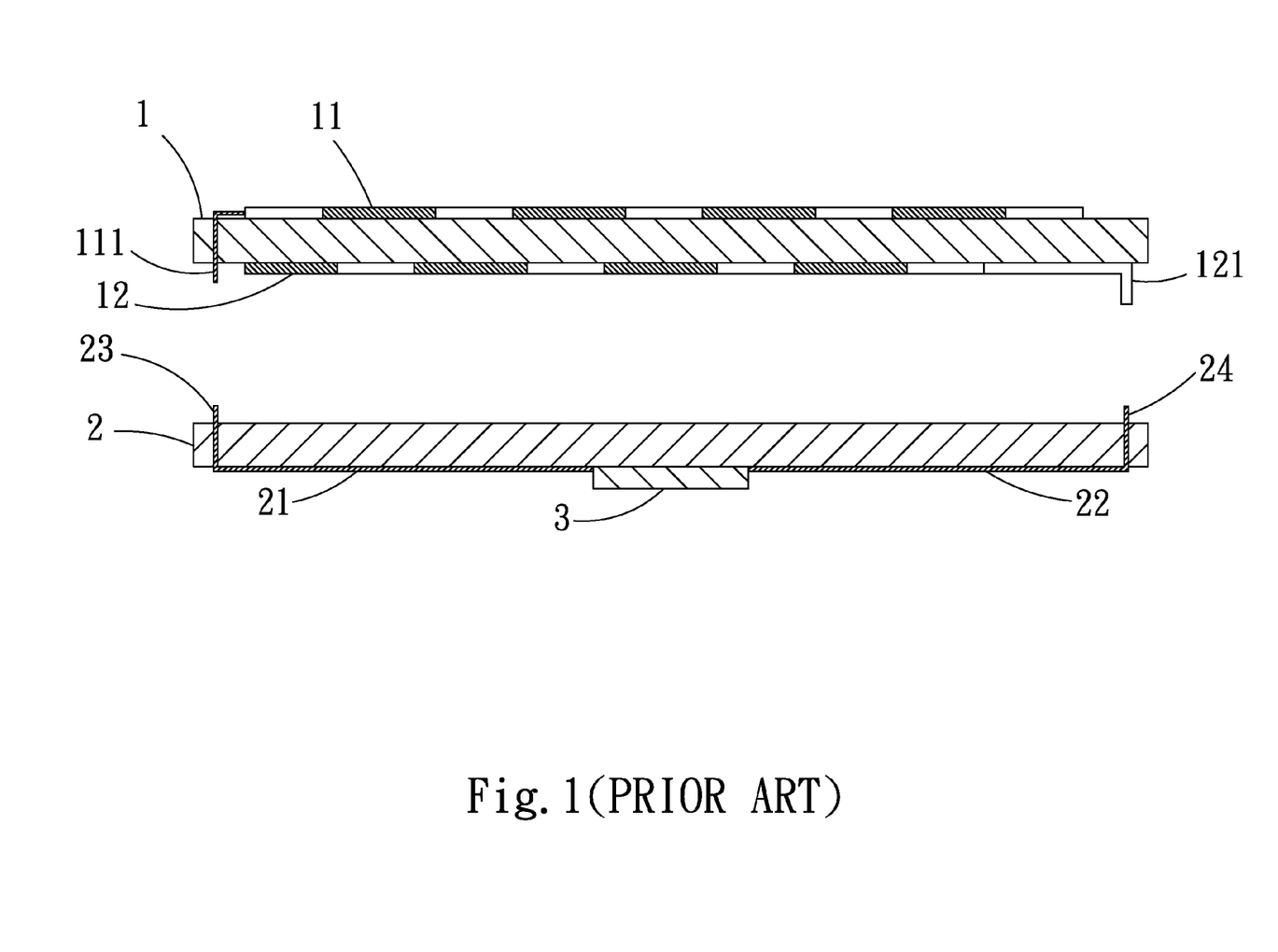
FIG. 1 is a schematic view showing a four-layer structure of a conventional touch pad.

The capacitance-type touch pad currently available in the market is made of two circuit boards and has a four-layer structure. As shown in FIG. 1, the touch pad is constituted of a first circuit board 1 and a second circuit board 2. Each of the first circuit board 1 and the second circuit board 2 has an upper surface and a lower surface respectively. The upper surface of the first circuit board 1 is etched to form columns of first conductors 11. The first conductors 11 penetrate one side of the first circuit board 1 to form a column of connecting terminals 111 on the lower surface of the first circuit board 1. Furthermore, the lower surface of the first circuit board 1 is etched to form rows of second conductors 12. The second conductors 12 form a row of connecting terminals 121 on one side of the lower surface of the first circuit board 1.

The lower surface of the second circuit board 2 is provided with a control chip 3. The lower surface of the second circuit board 2 is etched to form columns of leads 21 and rows of leads 22 connected to the control chip 3. One ends of the columns of leads 21 and the rows of leads 22 penetrate the second circuit board 2 respectively and form columns of connecting lines 23 and rows of connecting lines 24 on the upper surface of the second circuit board 2. The columns of connecting lines 23 and the rows of connecting lines 24 are electrically connected to the columns of connecting ends 111 and the rows of connecting ends 121 respectively.

Although the four-layer structure formed by the first circuit board 1 and the second circuit board 2 can achieve a crisscross arrangement of the first conductors 11 and the second conductors 12, the total thickness of the first circuit board 1 and the second circuit board 2 inevitably increases the thickness of a touch pad formed by these two circuit boards. As a result, such a four-layer touch pad cannot satisfy the requirements for compact design of modern portable electronic devices. On the other hand, the change of capacitance detected by the two separated layers of first conductors 11 and the second conductors 12 may be different, which causes erroneous determination of signals. In order to compensate for this error, the cost of providing circuits for signal analysis and the period of operation will be inevitably increased.

On the other hand, during the manufacture of the above-mentioned four-layer touch pad, four surfaces of the two circuit boards are coated with copper clad and then subjected to an etching process with optical masks. As a result, a large portion of the copper clad will be etched, which causes the waste of material and adverse effects to the environment.

According to the above, the prior art has disadvantages as follows:

(1) the thickness of the four-layer touch pad restricts the compact design of an associated electronic product;

(2) since at least two circuit boards are used, the materials and at least two manufacturing processes are needed, which causes the increase in total cost; and (3) a complicated process for signal analysis and a long period of operation are needed.

Therefore, it is an important issue for the present inventor and the manufacturers in this filed to solve the above-mentioned problems in prior art.

SUMMARY OF THE INVENTION

In order to solve the above problems, an objective of the present invention is to provide a touch pad which utilizes single piece of circuit board to reduce the material cost and simplify its manufacturing process.

Another objective of the present invention is to provide a single-piece touch pad which utilizes the existing process and material for a printed circuit board but has a higher yield of products.

A further objective of the present invention is to provide a touch pad which uses copper clad efficiently to reduce the waste of material.

In order to achieve the above objectives, the present invention provides a touch pad including a printed circuit board, a plurality of column-conductor groups and a plurality of row-conductor groups. The printed circuit board is formed with an upper surface and a lower surface. The column-conductor groups include first column-conductors and second row-conductors. The first column-conductors are provided on the upper surface of the printed circuit board, and the second column-conductors are provided on one of the upper surface and the lower surface and electrically connected to the first column-conductors. The row-conductor groups include first row-conductors and second row-conductors. The first row-conductors are provided on the upper surface of the printed circuit board, and the second row-conductors are provided on the other of the upper surface and the lower surface of the printed circuit board and electrically connected to the first row-conductors. The second row-conductors are separated from the second column-conductors by the printed circuit board, and both of them are arranged in a crisscross manner.

The printed circuit board is provided with plural column-vias and plural row-vias at the positions corresponding to the column-conductor groups and the row-conductor groups respectively. The column-vias penetrate and electrically communicate with the first row-conductors and the second row-conductors. Each of the second row-conductors is electrically connected to two sequentially arranged first row-conductors on the upper surface of the printed circuit board through the at least two column-vias. The row-vias penetrate and electrically communicate with the first row-conductors and the second row-conductors. Each of the second row-conductors is electrically connected to the two sequentially arranged first row-conductors on the upper surface of the printed circuit board through the at least two row-vias. With this arrangement, the upper surface of one printed circuit board can be provided with column-conductor groups and row-conductor groups at the same time, thereby reducing the material cost and simplifying the process for manufacturing a touch pad. By this inventive structure, the existing material and process can be still used in such a manner that the problem of crossed wires can be avoided and the yield of products can be increased with less waste of materials. Therefore, the present invention has advantages as follows:

(1) the number of printed circuit boards is reduced to satisfy the compact design of an electronic product;
(2) the material cost and production cost are reduced;
(3) the yield of products is increased dramatically; and
(4) the period for signal analysis is shortened.

DETAILED DESCRIPTION OF THE INVENTION

Figure 2:
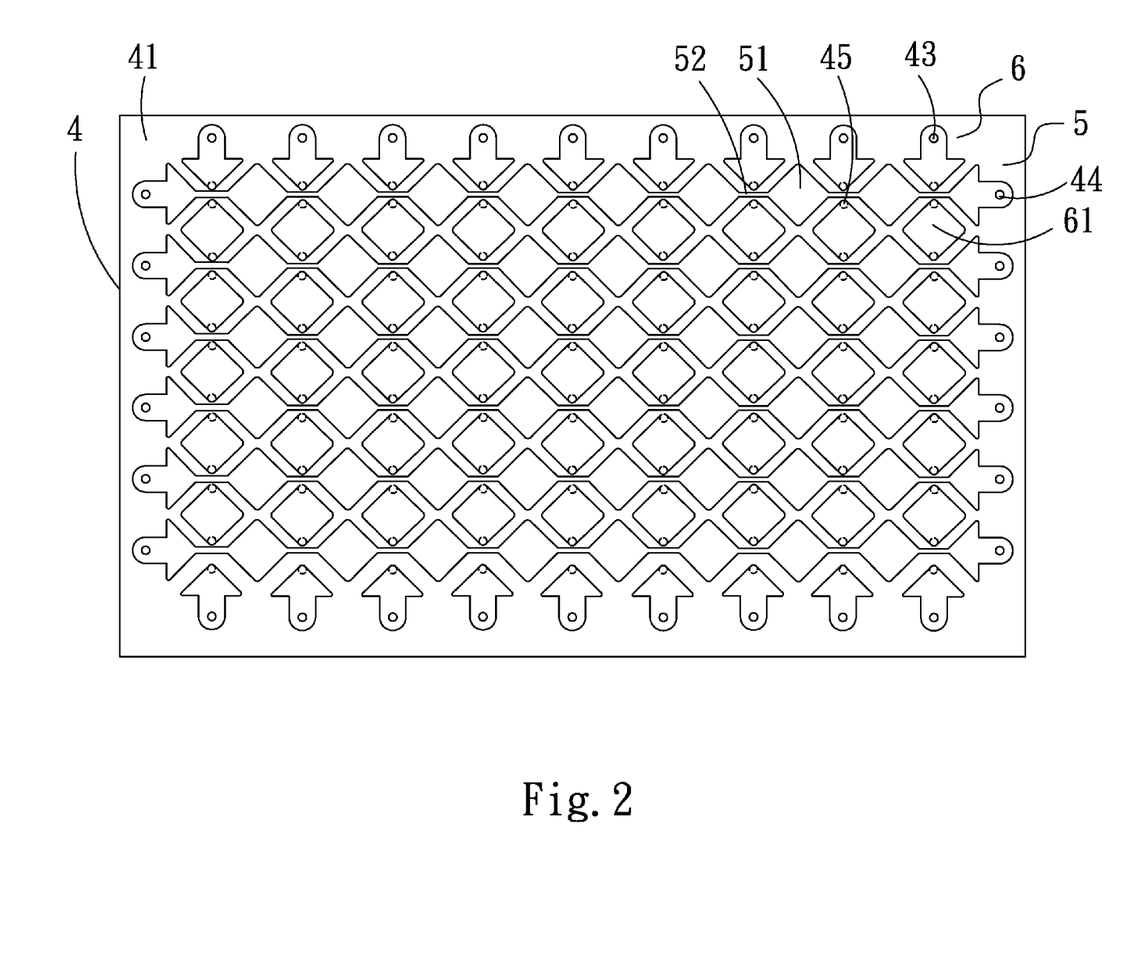
FIG. 2 is a top view showing a touch pad of the present invention.
Figure 3:
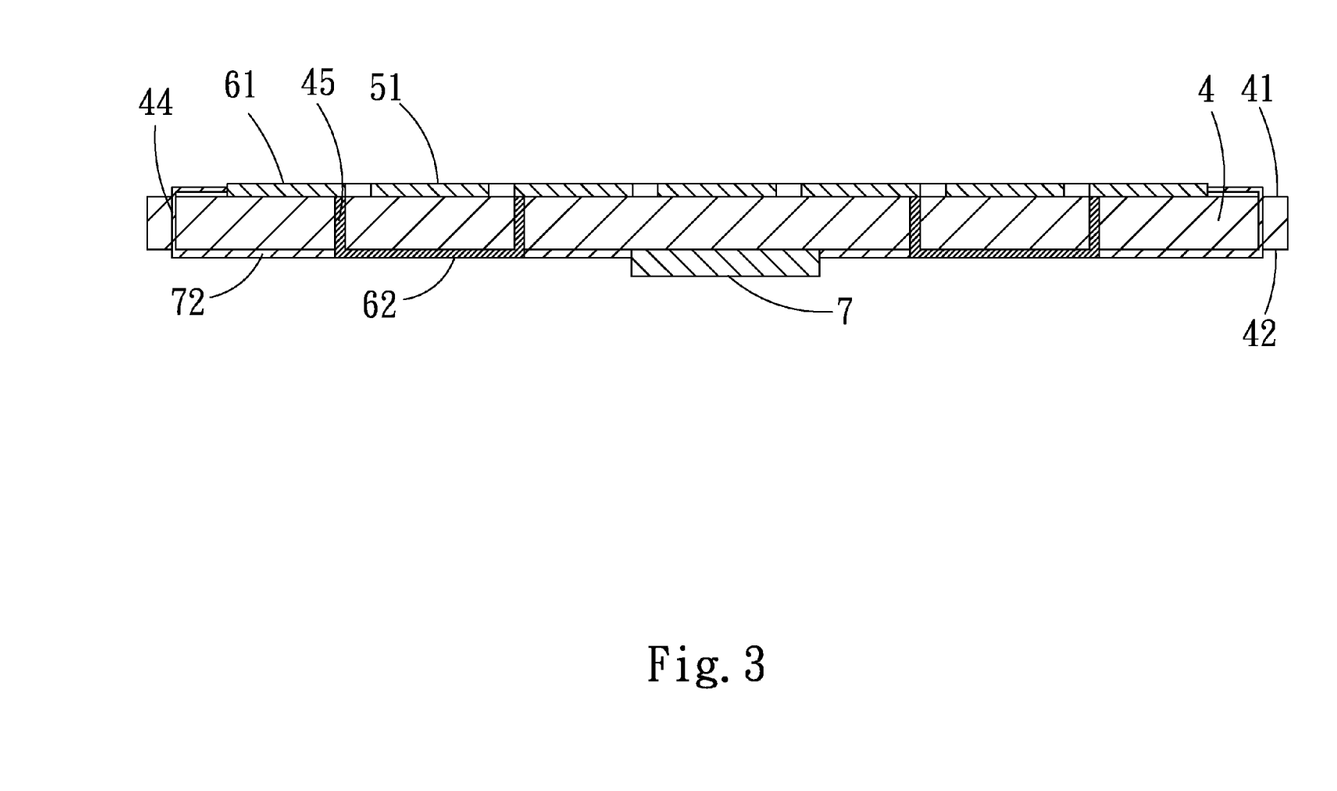
FIG. 3 is a cross-sectional view showing the touch pad of the present invention.
Figure 4:
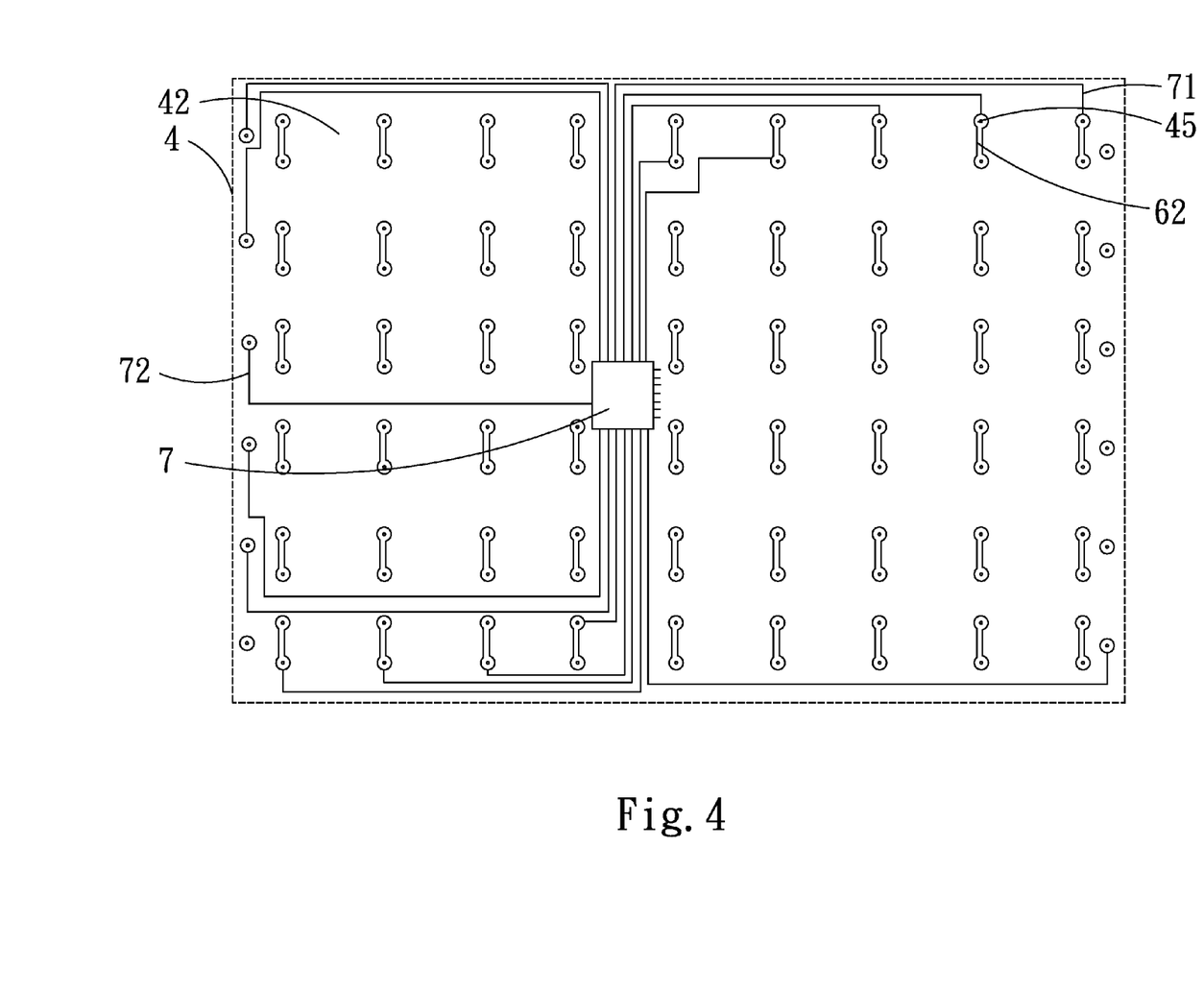
FIG. 4 is a bottom view showing the touch pad of the present invention.

The above objectives and structural and functional features of the present invention will be described in more detail with reference to a preferred embodiment thereof shown in the accompanying drawings Please refer to FIGS. 2 to 4. The present invention provides a touch pad, which includes a printed circuit board 4, a plurality of column-conductor groups 5, a plurality of row-conductor groups 6 and a control chip 7. The printed circuit board 4 has an upper surface 41 and a lower surface 42. The column-conductor groups 5 include plural first column-conductors 51 provided on the upper surface 41 and plural second column-conductors 52 provided on one of the upper surface 41 and the lower surface 42. The first column-conductors 51 and the second column-conductors 52 are capacitance-type sensors capable of generating signals when being touched. The area of the first column-conductors 51 is larger than that of the second column-conductors 52.

The row-conductor groups 6 include plural first row-conductors 61 provided on the upper surface 41 and plural second row-conductors 62 provided on the other of the upper surface 41 and the lower surface 42 at the positions corresponding to the second column-conductors 52. The first row-conductors 61 and the second row-conductors 62 are capacitance-type sensors capable of generating signals when being touched. The area of the first row-conductors 61 is larger than that of the second row-conductors 62. The column-conductors 5 and the row-conductors 6 are integrally formed by etching copper clad.

The control chip 7 is provided on the lower surface 42 of the printed circuit board 4. The printed circuit board 4 has two corresponding sides provided with plural chip-connected-column-vias 43 and plural chip-connected-row-vias 44 respectively. Each of the chip-connected-column-vias 43 is electrically connected to the control chip 7 through a first chip-lead 71, and each of the chip-connected-row-vias 44 is electrically connected to the control chip 7 through a second chip-lead 72.

In the present embodiment, the first column-conductors 51, the first row-conductors 61 and the second column-conductors 52 are all provided on the upper surface 41 of the printed circuit board 4, and the second row-conductors 62 are provided on the lower surface 42 of the printed circuit board 4 corresponding to the second column-conductors 52. The second row-conductors 62 are separated from the second column-conductors 52 by the printed circuit board 4, and both of them are arranged in a crisscross manner. The printed circuit board 4 is provided with plural row-vias 45 at the positions corresponding to the second row-conductors 62 on the lower surface 42. The row-vias 45 penetrate and electrically communicate with the first row-conductors 61 provided on the upper surface 41 and the second row-conductors 62 provided on the lower surface 42. Each of the second row-conductors 62 is electrically connected to the two sequentially arranged first row-conductors 61 provided on the upper surface 41 through at least two row-vias 45, so that the second row-conductors 62 provided on the lower surface 42 can be electrically connected to the first row-conductors 61 through the row-vias 45, and in turn electrically connected to the chip-connected row-vias 44, the second chip-leads 72 and the control chip 7 through the first row-conductors 61 on both sides, thereby generating column-conductors and row-conductors on the upper surface 41 of one layer of printed circuit board 4. Furthermore, the problem of crossed wires can be avoided.

Figure 5:
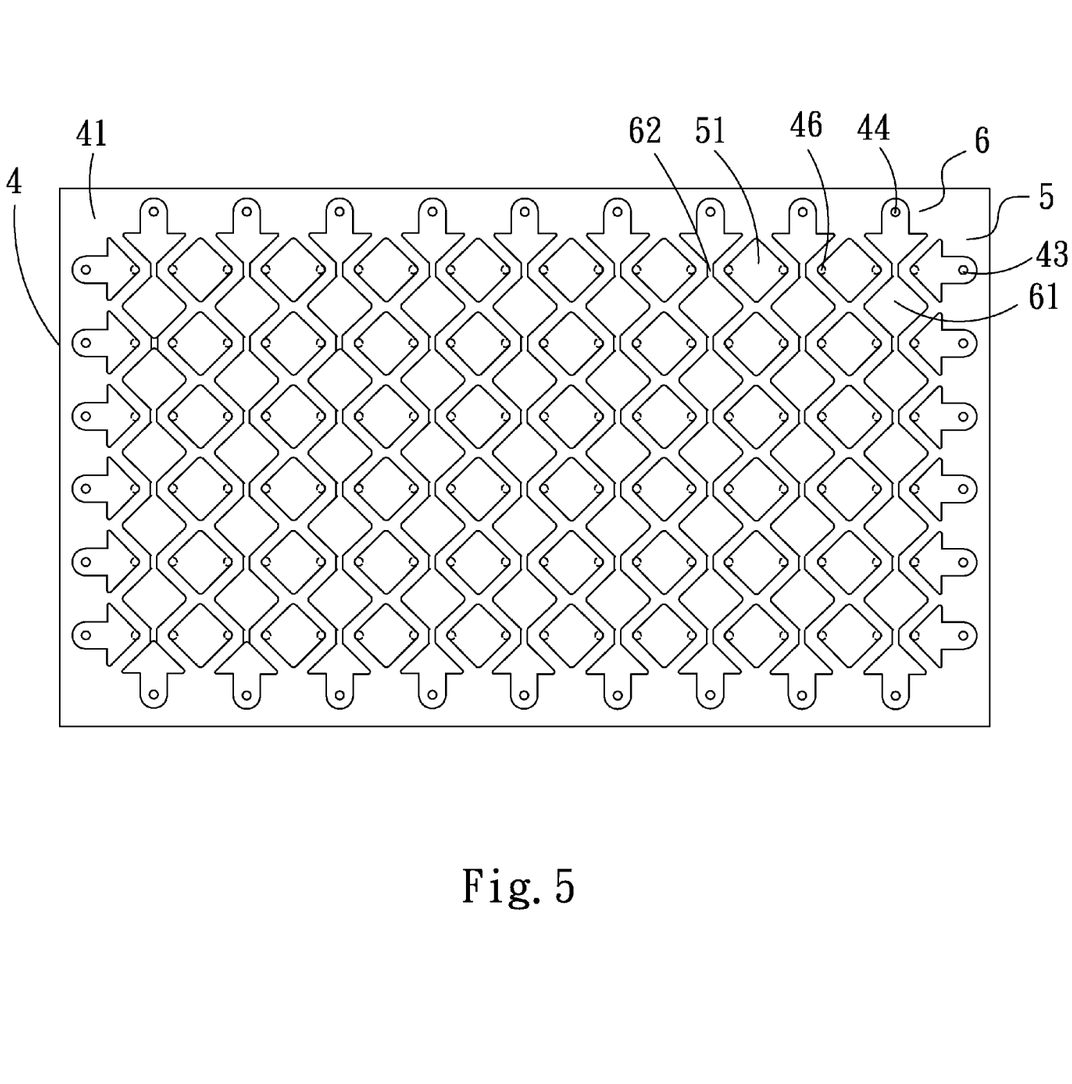
FIG. 5 is a top view showing the touch pad according to another embodiment of the present invention.
Figure 6:
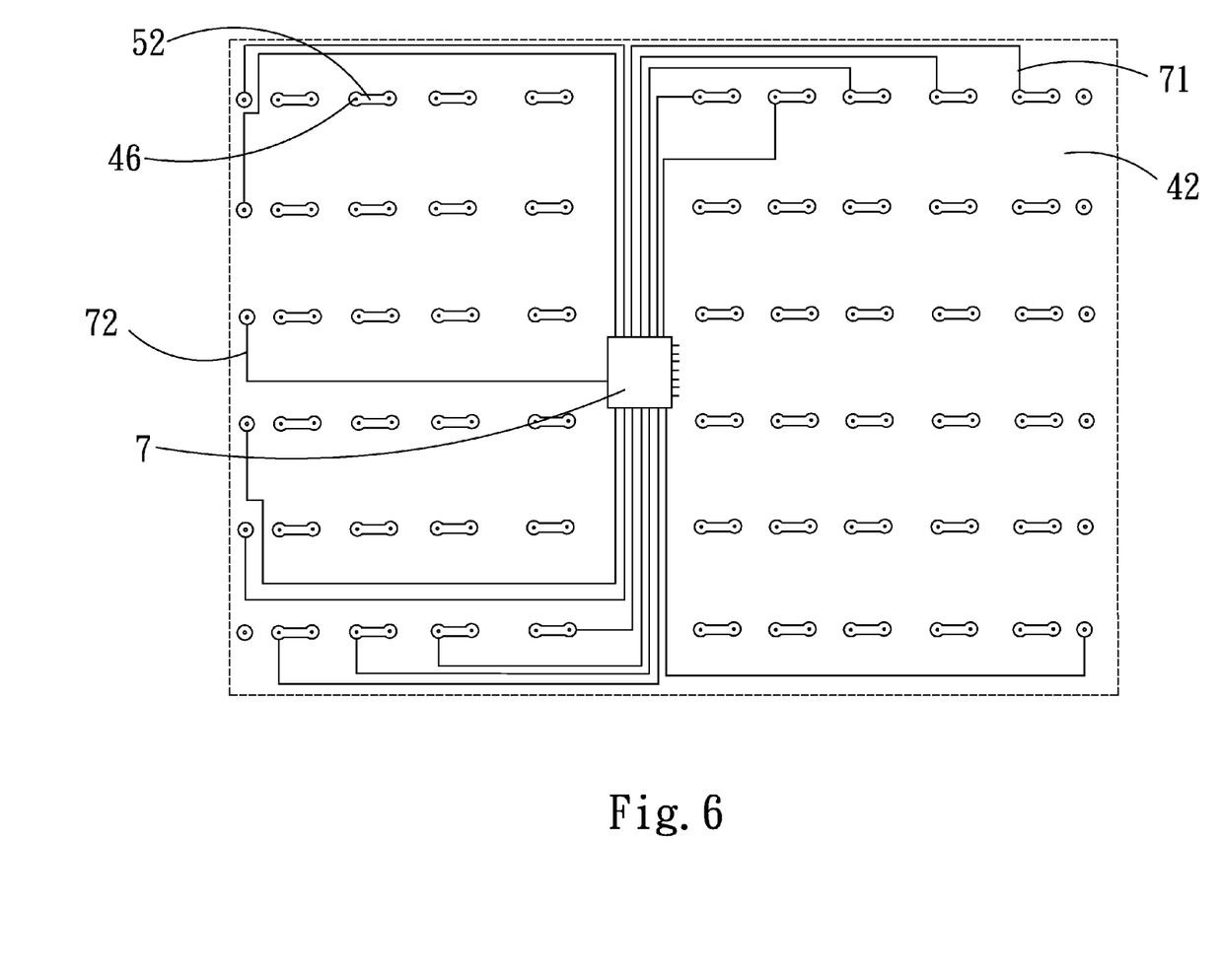
FIG. 6 is a bottom view showing the touch pad according to another embodiment of the present invention.

Please refer to FIGS. 5 and 6, which show another preferred embodiment of the present invention. The present embodiment is substantially the same as the previous embodiment in terms of the connection of elements and their operations, and thus the redundant description is omitted. The difference between the present embodiment and the previous embodiment lies in that: the first column-conductors 51, the first row-conductors 61 and the second row-conductors 62 are all provided on the upper surface 41 of the printed circuit board 4. The second column-conductors 52 are provided on the lower surface 42 of the printed circuit board 4 corresponding to the second row-conductors 62. The second column-conductors 52 are separated from the second row-conductors 62 by the printed circuit board 4, and both of them are arranged in a crisscross manner. The printed circuit board 4 is provided with plural column-vias 46 at the positions corresponding to the second column-conductors 52 on the lower surface 42. These column-vias 46 penetrate and electrically communicate with the first column-conductors 51 on the upper surface 41 and the second column-conductors 52 on the lower surface 42. Each of the second column-conductors 52 is electrically connected to two sequentially arranged first row-conductors 51 provided on the upper surface 41 through at least two column-vias 46, so that the second column-conductors 52 on the lower surface 42 can be electrically connected to the whole first column-conductors 51 through the column-vias 46, and in turn electrically connected on the chip-connected-row-vias 43, the second chip-leads 72 and the control chip 7 through the first column-conductors 51 on both sides, thereby generating column-conductors and row-conductors on the upper surface 41 of the one layer of the printed circuit board 4. Further, the problem of crossed wires can be avoided.

Figure 7:
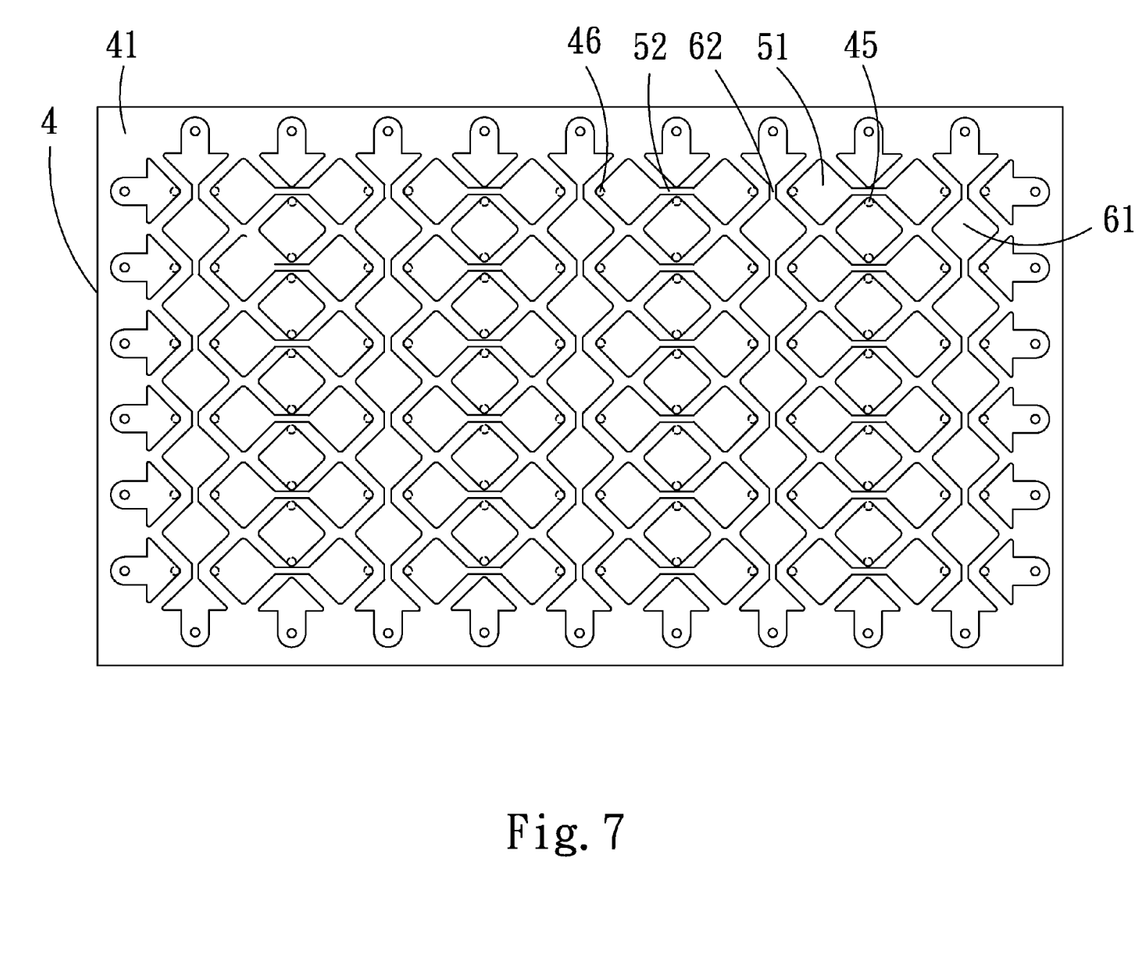
FIG. 7 is a top view showing the touch pad according to yet another embodiment of the present invention.
Figure 8:
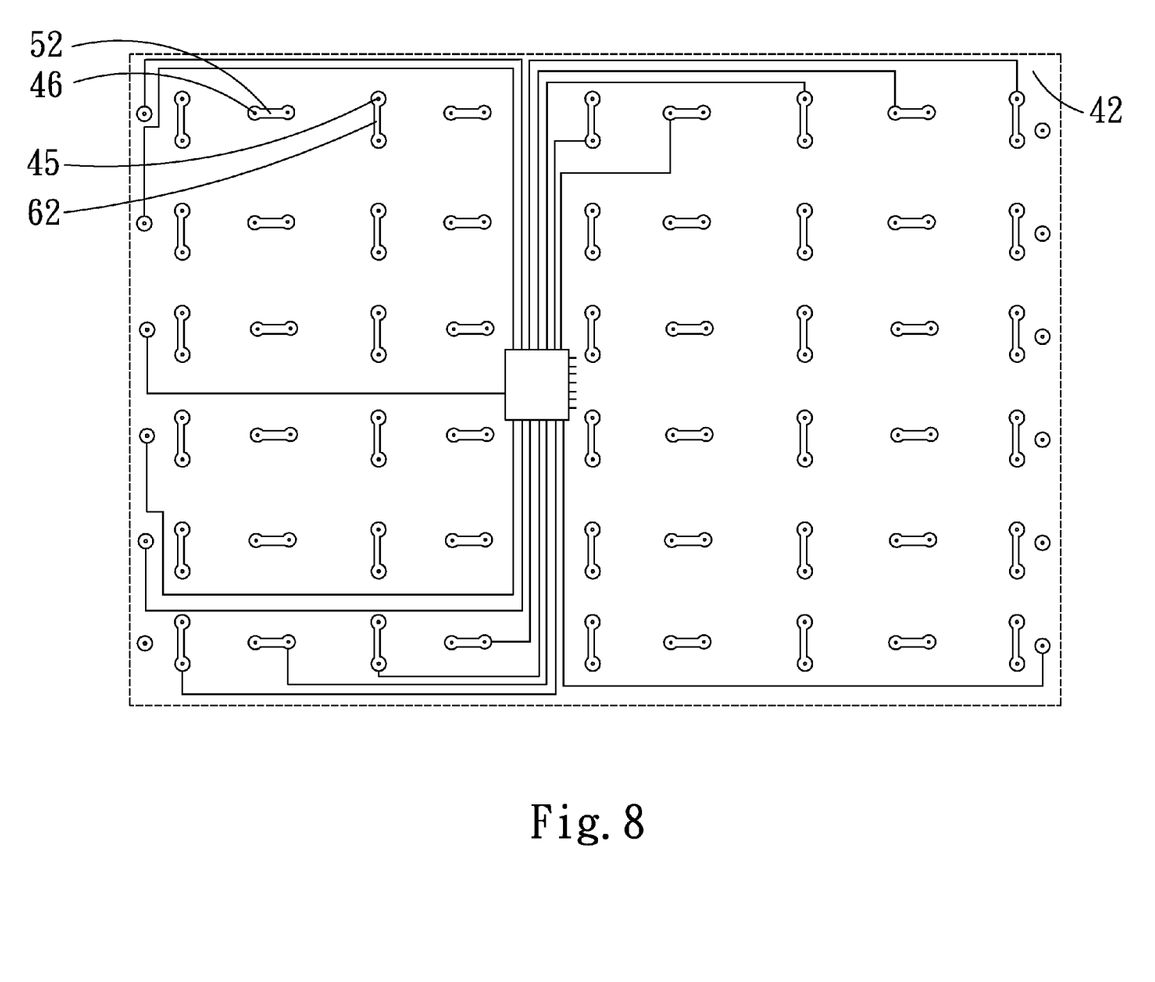
FIG. 8 is a bottom view showing the touch pad according to yet another embodiment of the present invention.

Please refer to FIGS. 7 and 8, which show a further preferred embodiment of the present invention. The present embodiment is substantially the same as the previous embodiment in terms of the connection of elements and their operations, and thus the redundant description is omitted. The difference between the present embodiment and the previous embodiment lies in that: a portion of the second column-conductors 52 are provided on the upper surface 41, and the rest of the second column-conductors 52 are provided on the lower surface 42. A portion of the second row-conductors 62 are provided on the upper surface 41, and the rest of the second row-conductors 62 are provided on the lower surface 42. In this way, the second column-conductors 52 are separated from the second column-conductors 62 by the printed circuit board 4, and both of them are arranged in a crisscross manner. The second column-conductors 52 and the second row-conductors 62 are electrically connected to the first column-conductors 51 and the first row-conductors 61 on the upper surface 41 through the column-vias 46 and the row-vias 45, thereby generating column-conductors and row-conductors on the upper surface 41 of the one layer of the printed circuit board 4. Further, the problem of crossed wires can be avoided. Also, the amount of materials for the circuit board can be reduced and the process for manufacturing the touch pad can be simplified. Furthermore, the yield of products can be increased and the waste of materials can be avoided.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A touch pad, comprising:
  a printed circuit board having an upper surface and a lower surface;
  a plurality of column-conductor groups including plural first column-conductors provided on the upper surface and plural second column-conductors provided on one of the upper surface and the lower surface and electrically connected to the first column-conductors; and
  a plurality of row-conductor groups including plural first row-conductors provided on the upper surface and plural second row-conductors provided on the other of the upper surface and the lower surface and electrically connected to the first row-conductors;
  wherein a portion of the second column-conductors are provided on the upper surface, the rest of the second column-conductors are provided on the lower surface, a portion of the second row-conductors are provided on the upper surface, the rest of the second row-conductors are provided on the lower surface, so that the second column-conductors and the second row-conductors are each arranged on both sides of the printed circuit board in a crisscross manner.

2. The touch pad according to claim 1, wherein the first column-conductors and the second column-conductors and the first row-conductors and the second row-conductors are capacitance-type sensors capable of generating signals when being touched.

3. The touch pad according to claim 1, wherein the area of the first column-conductors and the area of the first row-conductors are larger than the area of the second column-conductors and the area of the second row-conductors respectively.

4. The touch pad according to claim 1, further comprising a control chip provided on the lower surface.

5. The touch pad according to claim 4, wherein the printed circuit board has two corresponding sides provided with plural chip-connected-column-vias and plural chip-connected-row-vias respectively, each of the chip-connected-column-vias is electrically connected to the control chip through a first chip-lead, and each of the chip-connected-row-vias is electrically connected to the control chip through a second chip-lead.

6. The touch pad according to claim 1, wherein the column-conductors and the row-conductors are integrally formed by etching copper clad.

* * * * *